(12) United States Patent
Hufken et al.

(10) Patent No.: US 6,213,528 B1
(45) Date of Patent: Apr. 10, 2001

(54) VACUUM CUP

(75) Inventors: Gerardus L. C. Hufken; Johannes A. P. W. Segers; Jan A. Bijloo, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/414,460

(22) Filed: Oct. 7, 1999

(30) Foreign Application Priority Data

Oct. 20, 1998 (EP) .................................................. 98203533

(51) Int. Cl.$^7$ ..................................................... B25J 15/06
(52) U.S. Cl. ............................................. 294/64.1; 901/40
(58) Field of Search ................... 294/64.1, 64.2, 294/64.3; 414/627, 737, 752.1; 901/40; 271/90, 94, 108

(56) References Cited

U.S. PATENT DOCUMENTS

| 2,916,059 | * | 12/1959 | Wong | 294/64.1 |
| 3,743,340 | * | 7/1973 | Williamann | 294/64.1 |
| 3,940,172 | * | 2/1976 | Hutson et al. | 294/64.1 |
| 4,114,939 | | 9/1978 | Burt | 294/64 R |
| 4,593,947 | * | 6/1986 | Yocum | 294/64.1 |
| 4,749,219 | | 6/1988 | Bolle, Jr. et al. | 294/64 |
| 5,330,314 | * | 7/1994 | Bennison | 294/64.1 |

FOREIGN PATENT DOCUMENTS 89008141    1/1989   (JP) .

* cited by examiner

*Primary Examiner*—Dean J. Kramer

(57) ABSTRACT

The invention relates to a vacuum cup (1) that is able to ensure a very silent release of an object that is being held by the vacuum cup (1). The vacuum cup (1) comprises a channel (7) that allows a fast passage of ambient air into a vacuum chamber (3) to bring the vacuum chamber (3) to atmospheric pressure. Preferably, the channel (7) comprises openings (9, 9', 13) that have surface area's being large compared to the surface area of a top (10) of the vacuum chamber (3) in order to obtain a fast release.

3 Claims, 2 Drawing Sheets

VACUUM CUP

The invention relates to a vacuum cup for picking-up and holding an object. The vacuum cup comprises a vacuum chamber, and a gas inlet unit for bringing the vacuum chamber to atmospheric pressure. The gas inlet unit comprises a valve that is closed when the vacuum cup is in a condition of holding an object.

A vacuum cup comprising a gas inlet unit is known from JP-A 01-008141, in which a vacuum cup is provided having a cylinder. The cylinder comprises a piston, which acts as a pushing device. In order to release the object, air is entered into the vacuum cup. Simultaneously, air is entered into the cylinder and causes the piston to push the object. The pushing action releases the object before the pressure inside the vacuum cup has been raised to atmospheric pressure. In this way the time is reduced for releasing the object after the application of pressure to the vacuum cup.

Such a vacuum cup has the disadvantage that the device is relatively costly because of the complicated construction of the cylinder and piston. It is an additional drawback that the object might become damaged during the pushing action of the piston.

It is an object of the invention to provide a vacuum cup that silently releases the object, with less chance of damaging the object.

The vacuum cup according to the invention is characterized in that the gas inlet unit is provided with a channel for bringing the vacuum chamber to atmospheric pressure by allowing ambient air into the vacuum chamber. The use of ambient air as air filling the vacuum chamber provides a method for quickly releasing an object from a vacuum cup. An additional advantage is that the method is very silent. Since ambient air is used, in contrast to the more commonly used pressurized gas, while air is filling the vacuum chamber the occurrence of noise is prevented.

In a preferred embodiment a single gas inlet unit opening allows the passage of a large amount of air in a short period of time, thus bringing the vacuum cup very quickly to atmospheric pressure.

In another preferred embodiment multiple openings provide the advantage that the channel allows the passage of a large amount of ambient air into the vacuum cup in a very short time.

These and other aspects of the invention will be elucidated with reference to the embodiments described hereinafter.

In the drawings.

In general like reference numerals identify like elements.

Figure 1:
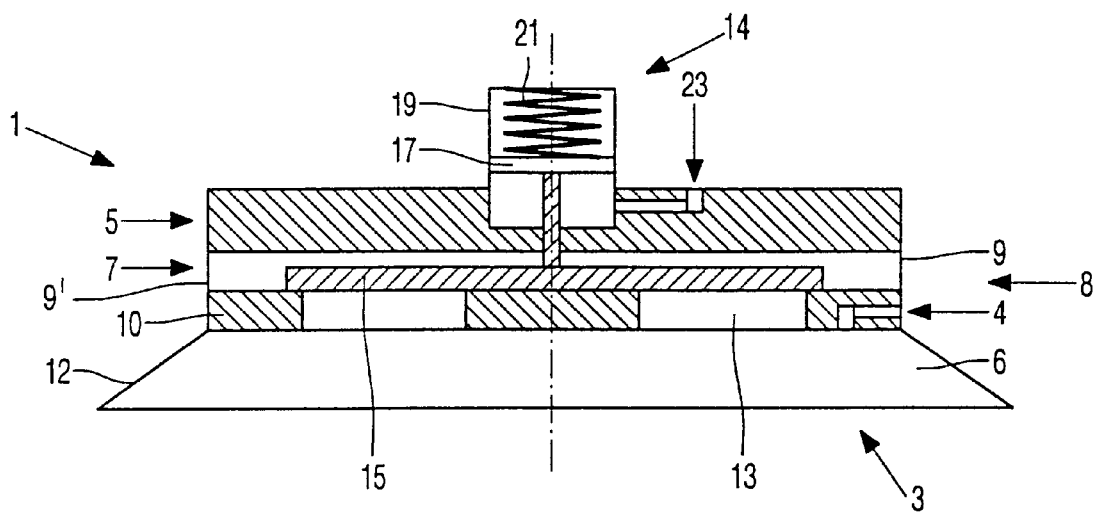
FIG. 1 is a schematic cross section of the vacuum cup according to the invention.

A schematic cross section of the vacuum cup 1 is shown in FIG. 1. The vacuum cup 1 comprises a vacuum chamber 3 and a body 5. When the vacuum chamber 3, comprising a rubber sleeve 6, is brought into contact with an object (not shown in the figure) and a condition of reduced pressure is created in the vacuum chamber 3, the object will be pressed against the vacuum cup 1 and may be transported or handled otherwise. In practice an under pressure of 0.7 bar ($0.7 \times 10^5$ Pa) in the vacuum chamber 3 is created by pumping the air out of the vacuum chamber 3 via an outlet 4.

The body 5 comprises a gas inlet unit 8, which is provided with a high gas flow conductance channel 7. The high gas flow conductance channel 7 comprises an inlet opening 9, which communicates with the ambient air, and an opening 13 communicating with the vacuum chamber 3. The inlet opening 9 has a surface area A3 and the opening 13 has a surface area A2.

The vacuum chamber 3 comprises a top 10, with a surface area A1 and side walls 12. In order to allow a large amount of air to enter into the vacuum chamber 3 in a short period of time, it is advantageous that the surface area's A3 and A2 are large fractions of the surface area A1 of the top 10. Good results have been obtained with surface area ratios A2 A1 and A3/A1 larger than 0.5. Satisfactory results have been obtained with surface ratios A2/A1 larger than or equal to 0.015 and A3/A1 larger than or equal to 0.02.

A control element 14 activates a valve 15 to open or close the opening 13. The valve 15 is closed when the vacuum cup is in the condition of holding an object. The valve 15 is connected to a piston 17, which is allowed to move within a cylinder 19.

A spring element 21 acting on the piston 17 brings the valve 15 into the closing position. By means of pressurized air entering into the cylinder 19 via the inlet 23 and acting on the piston against the action of the spring element 21, the valve 15 is opened. It is to be noted that pressurized air is only used to control the valve 15, not as air filling the vacuum chamber.

In practice it has been shown that such a construction allows very fast switching times between the open and closed position of the valve. Experimentally a time of a few milliseconds has been measured to bring the vacuum chamber 3 to ambient pressure, whereas in a situation of a state of the art gas conductance channel 7 this time typically amounts some hundreds of milliseconds or more. Since manufacturing cycles in factories often comprise only several seconds, the application of such vacuum cups 1 offers good opportunities to reduce the total manufacturing cycle time.

A prior art approach to reduction of the time to bring the vacuum chamber 3 to atmospheric pressure consists in the application of pressurized air as air flowing into the vacuum chamber 3. Vacuum cups based on this prior art approach have the disadvantage as compared to the vacuum cup 1 according to the invention, that the flow of pressurized air into the vacuum chamber 3 after the object has been released, produces a lot of noise.

Figure 2:
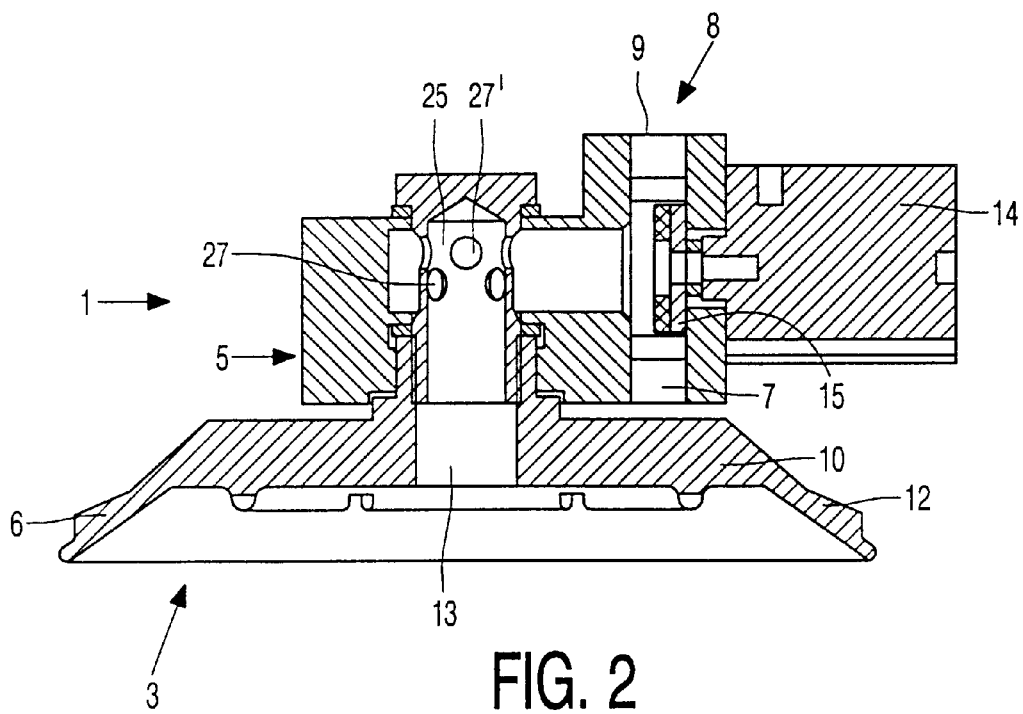
FIG. 2 shows a cross-sectional view of a first embodiment of the vacuum cup.

FIG. 2 shows a cross section of a first embodiment of the vacuum cup 1. A hollow bolt 25 connects the vacuum chamber 3 and the body 5 to each other. The hollow bolt is provided with holes (27, 27', . . . ) which allow the air to pass very quickly.

A control element 14 activates a valve 15 to open or close the opening 13. The control element 14 may be any purchased standard element, that opens the valve 15 when pressurized with air.

The application of the hollow bolt 25 and a control element 14 facilitates an easy adaptation of an existing vacuum cup into a vacuum cup 1 according to the invention. Since existing vacuum cups 1 can still be used, the costs of the introduction of vacuum cups 1 in factories will be reduced as compared to replacing all existing vacuum cups.

Figure 3:
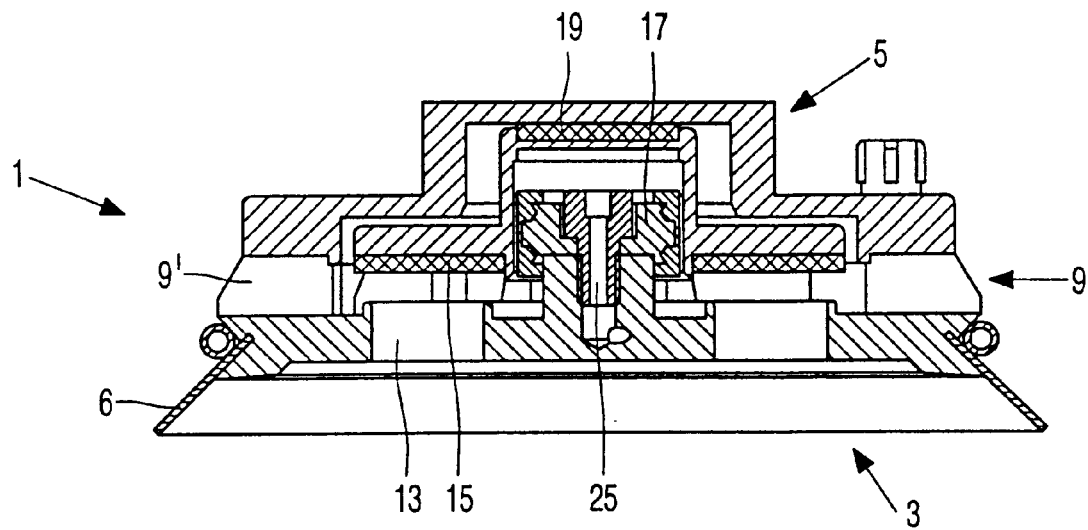
FIG. 3 is a cross section of a second embodiment of the vacuum cup.

FIG. 3 shows a cross section of a second embodiment of the invention. The high conductance gas flow channel 7 and the control element 14 have been integrated in the body 5. This allowed a further increase of the surface area's of the openings 9 and 13, which communicate with the ambient air and vacuum chamber 3 respectively. Within the body 5, the piston 17 is fixed and the cylinder 19 is allowed to move. Integrated into to the moving cylinder 19 is the valve 15 that opens or closes the opening 13.

Figure 4:
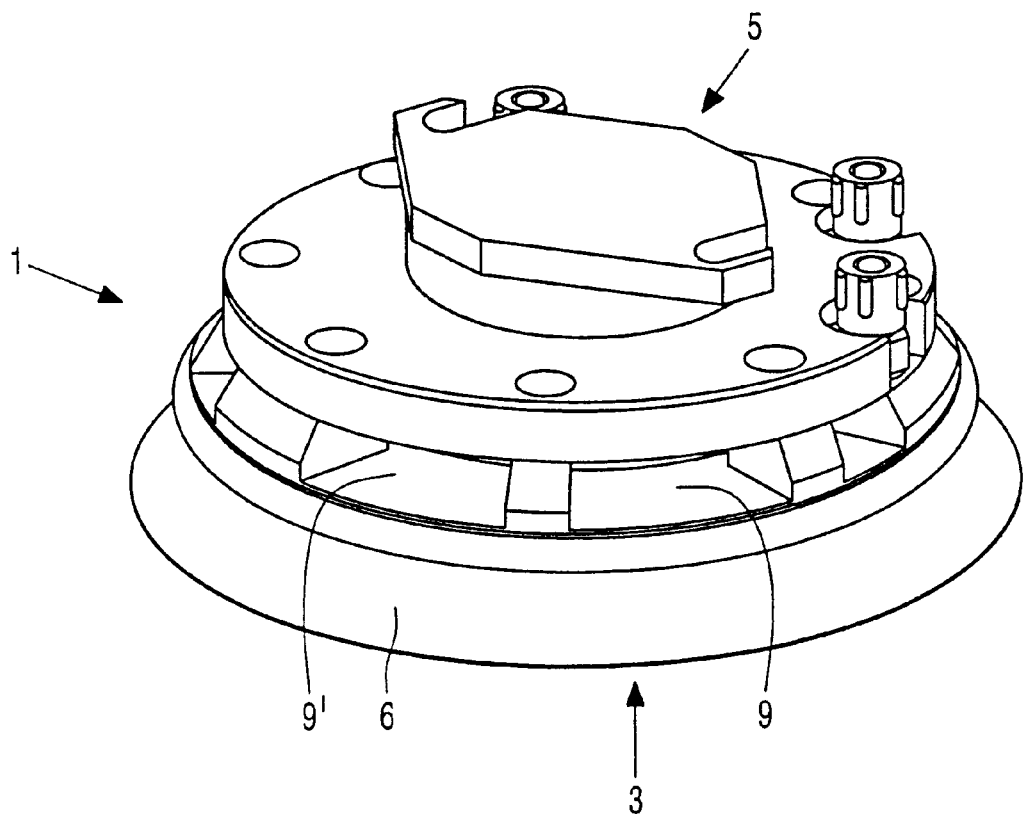
FIG. 4 is a side elevation of the second embodiment of the vacuum cup.

FIG. 4 shows a side elevation view of the second embodiment of the vacuum cup 1. The openings 9, 9' provide a large entrance for the incoming ambient air being used for bringing the vacuum chamber 3 to atmospheric pressure.

In summary the invention relates to a vacuum cup 1 that is able to ensure a very silent release of an object that is being held by the vacuum cup 1. The vacuum cup 1 comprises a channel 7 that allows a fast passage of ambient air into a vacuum chamber 3 to bring the vacuum chamber 3 to atmospheric pressure. Preferably, the channel 7 comprises openings 9, 9', 13 that have surface area's being large compared to the surface area of a top (10) of the vacuum chamber 3 in order to obtain a fast release of the object.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim.

What is claimed is:

1. A vacuum cup (1) for picking-up and holding an object, said vacuum cup (1) comprising a vacuum chamber (3) having a top (10) and side walls (12), said top (10) having a surface area A1, and a gas inlet unit (8) for bringing the vacuum chamber (3) to atmospheric pressure, said gas inlet unit (8) comprising a valve (15), said valve (15) being closed when the vacuum cup (1) is in a condition of holding an object, characterized in that the gas inlet unit (8) is provided with a conductance channel (7) for bringing the vacuum chamber (3) to atmospheric pressure by allowing ambient air into the vacuum chamber (3), the channel (7) has a plurality of inlet openings (9, 9', ...), said inlet openings (9, 9'. ...) having a total surface area A3, the ratio A3/A1 being equal to or larger than 0.02, which communicate with the ambient air, and an opening (13) communicating with the vacuum chamber (3), said opening (13) having an area A2, where the ratio of A2/A1 is equal to or larger than 0.015 and in the closed condition said valve (15) closes said opening 13.

2. A vacuum cup (1) for picking-up and holding an object, said vacuum cup (1) comprising a vacuum chamber (3) having a top (10) and side walls (12), said top (10) having a surface area A1, and a gas inlet unit (8) for bringing the vacuum chamber (3) to atmospheric pressure, said gas inlet unit (8) comprising a valve (15), said valve (15) being closed when the vacuum cup (1) is in a condition of holding an object, characterized in that the gas inlet unit (8) is provided with a channel (7) for bringing the vacuum chamber (3) to atmospheric pressure by allowing ambient air into the vacuum chamber (3), and said channel (7) has an opening (13) for allowing ambient air to flow into the vacuum chamber (3), said opening (13) having a surface area A2, the ratio of A2/A1 being larger than 0.5.

3. A vacuum cup (1) for picking-up and holding an object, said vacuum cup (1) comprising a vacuum chamber (3) having a top (10) and side walls (12), said top (10) having a surface area A1, and a gas inlet unit (8) for bringing the vacuum chamber (3) to atmospheric pressure, said gas inlet unit (8) comprising a valve (15), said valve (15) being closed when the vacuum cup (1) is in a condition of holding an object, characterized in that the gas inlet unit (8) is provided with a channel (7) for bringing the vacuum chamber (3) to atmospheric pressure by allowing ambient air into the vacuum chamber (3), and said channel (7) comprises a multiple of inlet openings (9, 9', ...) for allowing an inflow of the ambient air, said inlet openings (9, 9', ...) having a total surface area A3, the ratio A3/A1 being larger than 0.5.

* * * * *